US006981364B2

(12) United States Patent
Okamoto et al.

(10) Patent No.: US 6,981,364 B2
(45) Date of Patent: Jan. 3, 2006

(54) COMBINE ENGINE FOR SINGLE-STAGE SPACECRAFT

(75) Inventors: Osamu Okamoto, Tokyo (JP); Tatsuo Yamanaka, Saitama (JP); Masataka Maita, Tokyo (JP); Hideyuki Taguchi, Tokyo (JP); Takeshi Tsuchiya, Tokyo (JP)

(73) Assignee: National Aerospace Laboratory of Japan, Tokyo (JP)

( * ) Notice: Subject to any disclaimer, the term of this patent is extended or adjusted under 35 U.S.C. 154(b) by 238 days.

(21) Appl. No.: 10/623,601

(22) Filed: Jul. 22, 2003

(65) Prior Publication Data

US 2005/0016157 A1   Jan. 27, 2005

(51) Int. Cl.
*F02K 9/78*   (2006.01)
*F02K 7/18*   (2006.01)

(52) U.S. Cl. .............................. 60/224; 60/767; 60/768; 60/769

(58) Field of Classification Search ................... 60/767, 60/768, 769, 224
See application file for complete search history.

(56) References Cited

U.S. PATENT DOCUMENTS 2,920,446 A * 1/1960 Ranard ........................ 60/795

| | | | | |
|---|---|---|---|---|
| 3,752,172 A | * | 8/1973 | Cohen et al. ................ | 137/12 |
| 4,903,480 A | * | 2/1990 | Lee et al. .................... | 60/768 |
| 5,205,119 A | * | 4/1993 | Bulman ....................... | 60/269 |
| 5,214,914 A | * | 6/1993 | Billig et al. ................. | 60/767 |
| 5,899,061 A | * | 5/1999 | Bouchez et al. ............. | 60/267 |

FOREIGN PATENT DOCUMENTS

| JP | 7-4314 | 1/1995 |
|---|---|---|
| JP | 7-34969 | 2/1995 |

* cited by examiner

*Primary Examiner*—Ted Kim
(74) *Attorney, Agent, or Firm*—Westerman, Hattori, Daniels & Adrian, LLP

(57) ABSTRACT

A novel combined engine for a single-stage spacecraft is provided that combines a air-breathing engine utilizing oxygen in the atmosphere as oxidizer and rocket engines for obtaining thrust outside the atmosphere and that does not require a portion whose shape is variable in accordance with the flight speed. Rocket engines 15 are provided on struts 12 that form air introduction channels 10 in the air intake section 4. The rocket jets 18 from the rocket engines 15 control the flow of the airflows 16 introduced into the combustion chamber 20 in accordance with the flight speed. When the spacecraft 1 is stationary or in subsonic flight, the rocket jets 18 promote air intake into the combustion chamber 20 by lowering of static pressure due to expansion (ejector effect). In the subsonic flight condition, it performs the role of air compression, mixing with incoming air, fuel injection and ignition and during supersonic/ultra-supersonic flight it performs the role of a variable diffuser.

11 Claims, 10 Drawing Sheets

COMBINE ENGINE FOR SINGLE-STAGE SPACECRAFT

BACKGROUND OF THE INVENTION

1. Field of the Invention

The present invention relates to a combined engine for a single-stage spacecraft that employs oxygen in the atmosphere as oxidizer whilst within the aerospace and which is capable of achieving acceleration of the speed of flight from take-off speeds to orbital speeds with a single engine.

2. Description of the Related Art

The space shuttle is a known partially recoverable system for traveling back and forth between the ground and space orbits; however, the space shuttle carries a lot of propellants such as liquid fuel and oxidizer. The propellants occupy almost more than 80 percent of the gross weight at lift-off. There is therefore a limit to the extent to which the payload ratio with respect to the gross lift-off weight of the space shuttle can be increased. A recoverable spacecraft must rely on a rocket engine for traveling in space and at high altitudes where the air is very thin. However, consideration has been given to a combined engine of the air-breathing type, in which the amount of oxidizer carried can be reduced by utilizing the oxygen in the atmosphere as oxidizer when ascending through the atmosphere. Further, the engine generates higher performance than the pure rocket engine, as far as the vehicle can capture enough mass flow rate of air for its air-breathing propulsion engine.

The main thrust of current research and development has concerned the development of a two-stage spacecraft. There have been studied many concepts. The air turbo ramjet/rocket engine is one of them, in which the like utilizing atmospheric oxygen as the oxidizer is employed as the first stage and a rocket engine is employed as the second stage after the first-stage engine has separated. However, in the case of a two-stage spacecraft, tasks such as the development/manufacture of engines of two different types, coupling and separation of the rocket engine with the air turbo ramjet and maintenance and repair etc of the air turbo ramjet are necessary, resulting in higher operating costs. Although safety could be improved compared with that of the space shuttle, it cannot be expected that operating costs can be greatly lowered below those of pure rocket powered launch systems including the current space shuttle.

Instead of a two-stage spacecraft, a single-stage spacecraft may be advocated. In which flight is achieved with multiple propulsion systems and in which no mutual separation takes place from take-off from the runway up to Earth orbits (altitude about 50 kilometers or more, speed about 7000 meters per second or more). However, for such a spacecraft, the integrated engines having engine exhaust velocity of more than that of a chemical rocket engine (i.e. about 8000 meters per second or more) would be necessary and such an engine has not yet been developed for very high flight speeds beyond Mach No. 3.5.

A large number of conceptual studies and patent applications have been made concerning single-stage spacecraft. Practically all of these, however, concern engines wherein two or more engines of different types are mounted on the fuselage and the type of engine operating is changed over in accordance with the flying speed (see for example Japanese Laid-Open Patent Publication No. H7-34969) or an air-breathing Brayton cycle engine (see for example Japanese Laid-Open Patent Publication No. H7-4314) having a construction of variable shape, in which the shape is altered depending on the flying speed.

Combined engines, in which two or more engines of different type are mounted on the fuselage, have been studied for long time. For example, there are a LACE (liquid air cycle engine) capable of being allocated the speed region from take-off to about Mach 5 and the speed region of Mach 20 and above, and a scramjet engine capable of being allocated the speed region from the vicinity of Mach 4 to the vicinity of Mach 25. However, if the scramjet is supposed to be that of the Brayton-cycle, there has been never studied any of such engines effective beyond Mach number 8. Further, in such combined engines, air intake port changeover is required in order to change the air intake to the allocated engine in accordance with flight conditions. In ultra-supersonic flight, the problem arises of high thermal loading due to conversion of the increasing dynamic pressure of the admitted air into higher heat. However, regarding the moveable device that is required to effect changeover of the air intake port, there are technical problems in the design of a heat-resistant structure including heat-resistant materials capable of coping with such high thermal loads, which make such a device difficult to implement at the present time. As the range of flight speed is made wider, it becomes necessary to adopt expedients such as making the shape of the passage cross-section of the air intake section or the shape of the nozzle variable. Such a construction in which the air intake section or nozzle shape is made variable requires the provision of a large number of actuators for making the shape variable and is subject to problems such as that the construction of the engine becomes complicated and manufacturing costs are increased.

A geometry variable Brayton ram/scram-combined-jet engine provides with for example a flow path linking a front aperture section, a central hollow section and an aft aperture section, and all these sections are required variable geometry to change the flow path area. Further, it is required to provide with a device for injecting hydrogen into the central hollow section, and part of the member constituting the periphery of the flow path being of a moveable construction and additionally provided with a device for closing the front aperture. During atmospheric flight, it functions as a jet engine, burning the hydrogen using atmospheric oxygen; during flight outside the atmosphere, the air intake port is closed and another rocket engine system is required onboard to inject the vehicle into the mission space orbit. Because the ram/scram-combined-jet engine starts only from flight Mach number of about 5, the vehicle has to have another propulsion engine system to arrive the flight speed from the ground take-off. This combined engine also is difficult to implement, for the same reasons as in the case of a spacecraft carrying engines of two or more types. Additionally, its high-speed operating limit is predicted to be actually about 10 to 12 in terms of flight Mach number, due to limitations regarding the supersonic diffuser that is required for supersonic combustion (lowering the incoming air local Mach number prior to combustion, raising the static pressure and ensuring the necessary combustion chamber pressure), and because the released energy of the combustion becomes much smaller than the total energy of the incoming air, i.e. the energy required to accelerate the incoming air to the atmosphere is lost due to the internal momentum losses.

Thus, with a single-stage spacecraft, in regard to altering the shape of the wall surfaces of the air intake section or supersonic variable diffuser in response to flight speed, there are many aspects whose solution is difficult from the technical and cost point of view. If a sophisticated fluid dynamics is applied to the engine mainstream, an air intake section and supersonic diffuser whose wall surface shape will not be needed to change. Whereas, in the conventional Brayton cycle engine, this was sought be achieved by an air intake section and supersonic variable diffuser of variable shape during supersonic/ultra-supersonic flight, produced by mechanically changing the shape of the wall surface. An innovative method of making the intake of air to the combustion chamber variable in accordance with the flight speed by a more simple and inexpensive configuration is therefore sought. Accordingly, there exists the problem to be solved, in a wide range of flight speeds, to make possible changeover of engine mode by a fluid dynamic concept without variable geometry configuration.

SUMMARY OF THE INVENTION

An object of the present invention is to provide a novel and elegant combined engine for a single-stage spacecraft combining an air-breathing engine utilizing the oxygen present in the atmosphere as oxidizer with rocket engines to obtain thrust outside the atmosphere. However, in which mechanical alteration of shape for changing over the air-breathing engine mode in accordance with flight speed is unnecessary and that makes it possible fluid-dynamically to obtain the same function as this mechanical alteration of shape.

In order to solve the aforesaid problem, a combined engine for a single-stage spacecraft according to the present invention comprises, an air intake section; an engine main body section including combustion chamber and an exhaust nozzle section, in this order, wherein rocket engines that inject the engine exhaust flows as rocket jets into said combustion chamber are arranged on struts that partition said air intake section into a plurality of air introduction channels.

With this combined engine for a single-stage spacecraft, the airflows that is introduced into the combustion chamber can be controlled by means of the rocket jets which are adjusted according to the flight speed. The changeover of the engine mode is effected fluid dynamically, utilizing the rocket jets that are injected by the rocket engines assembled in engine struts of the engine inlet section. In such a combined engine for a single-stage spacecraft, the rocket jets injected by the rocket engine have an action of promoting air intake from the air intake section to the combustion chamber (ejector effect), due to lowering of static pressure produced by means of the expansion. The rocket engine jets can also perform air compression (the role of the compressor of a jet engine typified by the Brayton cycle turbojet engine), mixing with incoming air, fuel injection and ignition. In addition, during supersonic/ultra-supersonic flight, the role of a variable diffuser is implemented by varying the intensity of the rocket engine jets. When air intake cannot be obtained, as when flying outside the atmosphere, thrust can be obtained by means of the rocket engine jets.

In this combined engine for a single-stage spacecraft, various complex mechanisms are composed of fluid dynamic and fixed walls. Said engine internal flows may comprise a jets and airflows coexisting section in which both said rocket jets and airflows introduced through said air introduction channels are present. The mixing section in which said rocket jets and said airflows are mixed to form mixed gas, with not only hot enough ignite the gas but also with fuel-rich rocket exhaust gas for air/fuel combustion. The combustion section in which said mixed gas is burnt. The upstream region of the combustion chamber has a jet and airflow coexisting section in which the jets and the airflows are zoned without mixing. In the downstream region, there is formed the mixing section in which the rocket jets and the introduced airflows are mixed and, the combustion section in which the mixed gas is burnt on the downstream side of the mixing section; thus a very simple configuration is achieved in which there are basically no portions of variable shape in the passage or on the walls.

In this combined engine for a spacecraft, each flow rate of the airflow may be controlled by varying the air channel area of said airflow immediately upstream of said mixing section by varying the shape of said rocket jets. Changing the shape of the rocket jets alter the air channel areas of the airflows. Controlling the rocket engine combustion pressure easily performs the change of the shape of the rocket jet. The entering airflows will be mixed with the fuel-rich rocket exhaust gases for combustion, i. e. air-breathing engine. The channel areas of the airflows become narrower as the widths of the rocket jets are increased. Controlling the rate of incoming air flowing into the combustion chamber by means of the rocket jets (i.e. controlling the combustion chamber pressure) is much easier than inlet shape control by a variable structure. Thus, even though each passage wall surface shape of the air introduction channel is fixed and invariant, this can play the role of an adaptable inlet that is automatically adapted to the main fluid dynamical elements of the air-breathing cycle engine in the entire flight speed region. That is the channel areas of the airflows can be altered by means of the widths of the rocket jets, instead of using a variable-shape inlet.

In this combined engine for a spacecraft, by changing the shapes of the rocket jets, the air intake section can provide an equivalent function to that of the variable-shape air intake section that is required in a Brayton cycle engine in supersonic or ultra-supersonic flight. In the actual high supersonic Brayton cycle engine, the air intake section (inlet) is made geometrically variable. The variable-shaped air intake section is required that presents different shapes depending on the flight Mach numbers during supersonic and ultra-supersonic flight. The combined engine for a single-stage spacecraft according to the present invention, an equivalent role to that of the variable-shaped air intake section can be performed by fluid dynamically adaptation provided by the shapes of the jets. By varying the shapes of the rocket jets, this can be easily performed even though the air intake section is of geometrically fixed shape.

In this combined engine for a spacecraft, said mixing section and said combustion section may comprise an equivalent function to a variable shape diffuser required for a Brayton cycle engine in supersonic or ultra-supersonic flight by varying the shapes of said rocket jets. Whereas, in a Brayton cycle engine, a variable shape diffuser is required that lowers the Mach number of the engine internal flow and raises the static pressure by reducing the cross-sectional area of the channel during supersonic and ultra-supersonic flight. On the other hand in this combined engine for a spacecraft, the role of a variable-shaped diffuser can be adaptively performed by a jet diffuser, which adapts fluid dynamically by means of the shapes of the rocket jets. This is because that since the rocket jets are injected into the combustion chamber, even though the mixing section and combustion section are not of variable shape but are of fixed shape, the rocket jets work as above stated.

In order to secure the operation of the combined engine at ultra-supersonic flight speeds of flight such as beyond the speed limit of the conventional scramjet Mach number 12 or more, some methods are needed to acquire the required static pressure, i. e. supersonic diffuser. In this combined engine for a spacecraft comprising a jet diffuser as stated previously, the necessary combustion pressure is secured by the mixture mainly with the pressure of said rocket jet, in addition to an equivalent function to the variable shape diffuser of said rocket engine. In the flight Mach number region ($9<M\infty<12$) that is believed to represent the limit for flight using a Brayton cycle engine, the necessary combustion pressure is secured by mixing with the pressure of the rocket jets, in addition to the rise in static pressure produced by the jet diffuser, thereby making it possible to achieve flight of the spacecraft beyond the aforesaid flight limit.

In this combined engine for a spacecraft comprising a jet diffuser as stated above, the necessary combustion pressure is also secured by controlling generation of oblique shock waves caused by development of boundary layers accompanying perspiration cooling in the mixing section and the combustion section, in order to prevent excessive rise in thrust at ultra-supersonic flight speeds of flight Mach number 19 and above. The size of the rocket jets should be smaller, which will be realized by the lower rocket engine combustion pressure. The required air/fuel combustion pressure will be mainly acquired by the above stated oblique shock waves. In flight Mach number region ($M\infty>19$ to 20), a combined engine (scramjet constituting a Brayton cycle engine) is in a flight region in which the limit of a variable-shaped supersonic diffuser is exceeded and there is an excessive increase in thrust. Therefore, in addition to mixing with the injection pressure, a function equivalent to a variable-shape diffuser is achieved by lowering the pressure of the combustion chamber of the rocket engines. Then, the rise in pressure due to mixing with the injection pressure is suppressed. The perspiration cooling of the fuel is employed over the inner surface of the combustion chamber i.e. the entire surface of the mixing section and the combustion section. By suitable design of the sweating rate, boundary layers are developed by perspiration cooling and oblique shock waves are generated by these boundary layers that are developed on the walls. The boundary layer induces momentum loss well as pressure loss, however, this plays a role of diffuser, i. e. an enabling supersonic diffuser will be realized for very high ultra-supersonic flight speeds.

In the combined engines for spacecraft as described above, changing the combustion chamber pressure can change the rocket jet shapes. By changing the combustion chamber pressure of the rocket engines, the strength of the rocket jets that are injected into the combustion chamber from the rocket engines can be varied and consequently the degree of spreading thereof into the combustion chamber can be varied. Normally for this rocket engines, liquid hydrogen is employed as the fuel and liquid oxygen is employed as the oxidizer; alternatively, oxygen acquired from the atmosphere could be employed.

In this combined engine for a single-stage spacecraft, the air/fuel flow rate ratio in said mixing section can be controlled by altering the equivalent ratio of oxidizer and fuel in the combustion chambers of the rocket engines. When the rocket engines are operated under excess fuel condition, the air/fuel flow rate of the mixed gas in the mixing section can be altered to be fuel-rich. That can be easily performed by changing the flow rate ratio O/F of the oxidizer/fuel in the combustion chambers of the rocket engines.

In this combined engine for a single-stage spacecraft, the rocket jets may generate Mach disks upstream of the mixing section in a subsonic or supersonic flight speed region. A rise in pressure on the downstream side of the Mach disks can be produced by generation of the Mach disks by the injection into the mixing section. Specifically, in a Brayton cycle jet engine, for low-speed flight such as subsonic flight or supersonic flight at lower Mach number than higher supersonic, it is required that the incoming airflow should be compressed to raise the combustion pressure. With the present invention, the Mach disks (perpendicular shock wave) generated upstream of the mixing section can achieve the same role as that of the required mechanical compressor of the turbojet engine while adapting fluid-dynamically thereto. Also, the Mach disks (perpendicular shock wave) generated by the rocket jets absorb fluctuations of static pressure generated in the downstream mixing section and combustion section. That so makes it possible to stabilize the air flow rate within the engine such that there are no effects on the flow of the upstream section, which is in a subsonic condition.

In this combined engine for a single-stage spacecraft, the engine performance required by the given fuselage design can be secured by providing a number of the rocket engines that satisfies the thrust requirements from take-off from the runway up to Earth orbit. In control of thrust level of the engine, simply in terms of combustion chamber pressure of the rocket engine and flow rate O/F of the oxidizer/fuel, there are limitations due to flight requirements. Those are as followings: The first is the one-engine-out requirement during take-off. The second is the high thrust requirement during take-off. The third is the high thrust requirement because of higher drags during transonic flight. The fourth is the requirement in term of fuselage structural design regarding dynamic pressure during the flight, because the flight dynamic pressure should be controlled under the limit values. The fifth is the requirement in regard to flight acceleration concerning restrictions on the ability of passengers to withstand the load; the permissible acceleration is supposed to be under three gravity accelerations for onboard crews. The sixth is the requirement for low thrust satisfying the restriction on required flight acceleration in the final phase of the mission in hypersonic flight region. In response to the above requirements, the target mission can be achieved by a multi-strut rocket construction comprising a number thereof satisfying all of the various requirements.

DESCRIPTION OF THE PREFERRED EMBODIMENTS

An embodiment of a combined engine for a single-stage spacecraft according to the present invention is described below with reference to the appended drawings.

Figure 1:
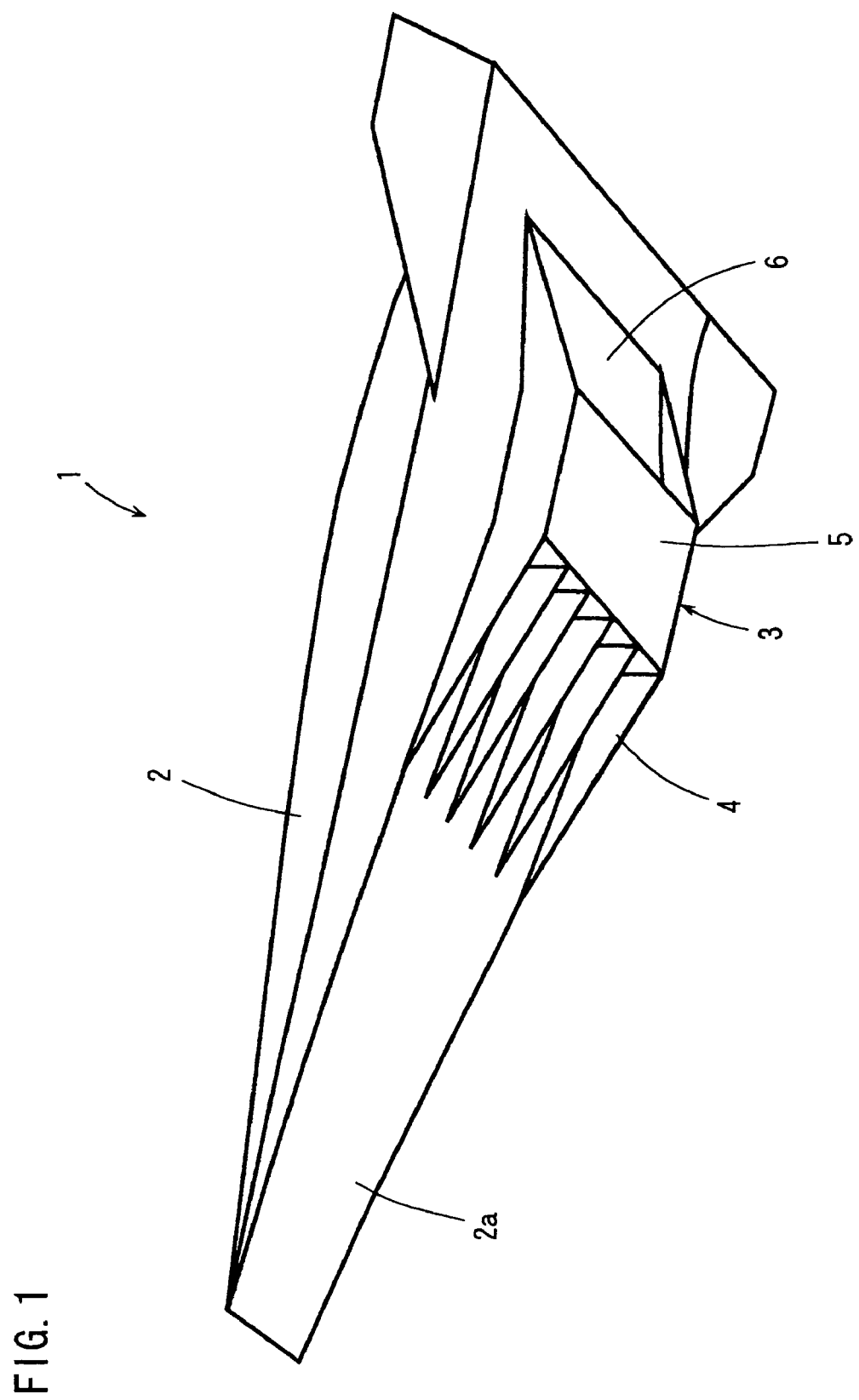
FIG. 1 is a perspective view showing schematically an entire spacecraft carrying a combined engine for a single-stage spacecraft according to the present invention.

In the single-stage spacecraft 1 shown in FIG. 1, a combined engine 3 for single-stage spacecraft according to the present invention (hereafter, for simplicity, in the description of the embodiment, this will be referred to as "combined engine 3") is mounted aft below the main body 2 of the fuselage. The combined engine 3 has a size extending along substantially the entire width of the main body 2 of the fuselage and comprises, in order in the longitudinal direction, an air intake section 4, an engine main body section 5 and an exhaust nozzle 6 having a half-nozzle shape. The fuselage main body 2 is provided with a front ramp 2a constituting a ramp not only for guiding air into the engine, but also for compression of the entering airflow into the combined engine 3 at supersonic and ultra-supersonic flights by means of oblique shock waves.

Figure 2:
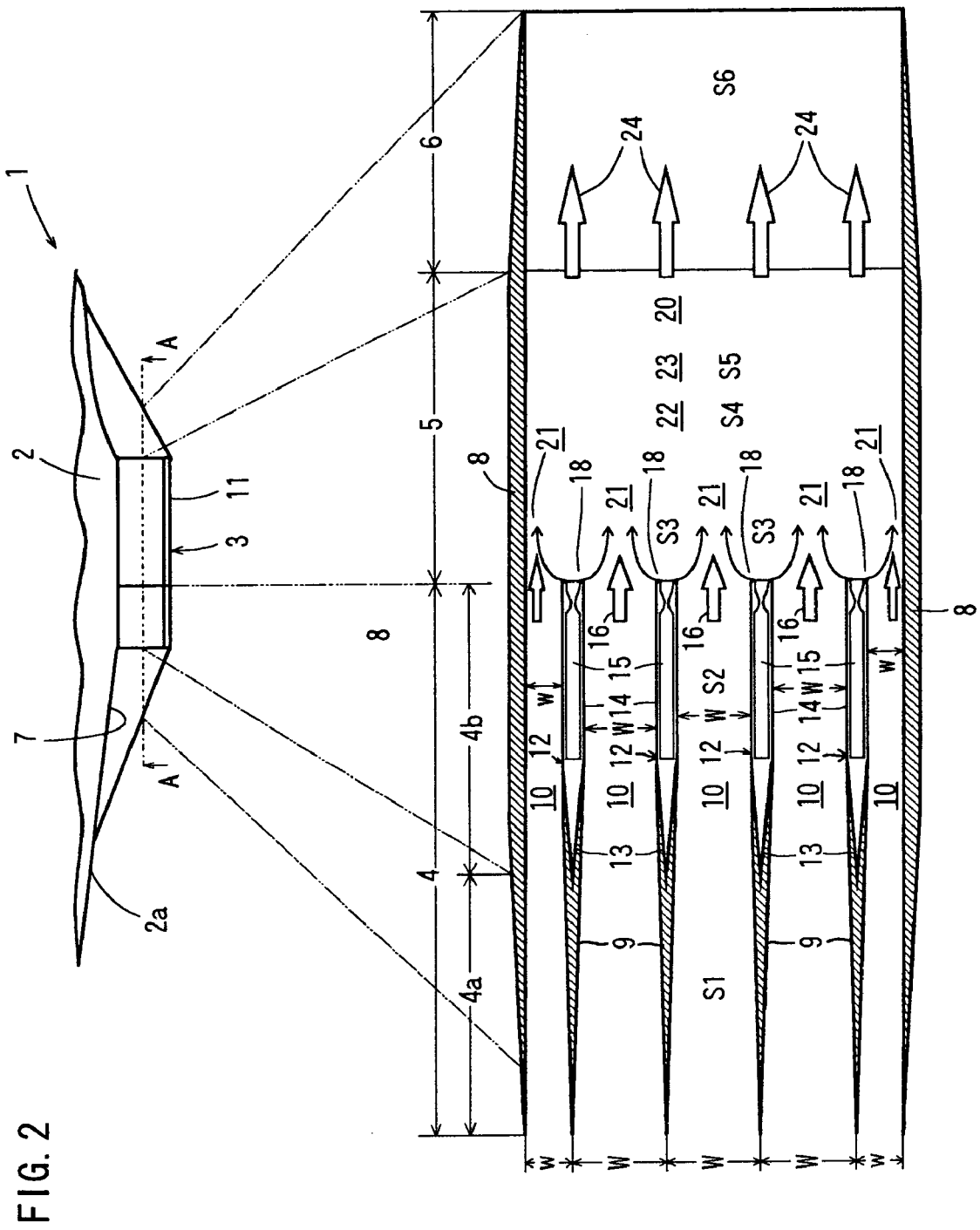
FIG. 2 is a partial side view including a combined engine of a single-stage spacecraft shown in FIG. 1 and an enlarged cross-sectional view taken along the line A—A of the combined engine.

As an example of a multi-strut rocket, the rocket engine shown in FIG. 2 is a strut rocket comprising four struts as an example. As shown in FIG. 2, the air intake section 4 is formed utilizing part of the flat undersurface 7 of the main body 2 of the fuselage between the engine side walls 8, 8 at both ends thereof in the width direction. The undersurface 7 is part of the front ramp 2a extending from the head of the main body 2 of the fuselage. The space between the two side walls 8, 8 is partitioned in the width direction by a plurality of partitions 9 erected at right angles with respect to the undersurface 7 and separated in the width direction at the front portion 4a, and this portion 4a is open downwards. In this front portion 4a, the two side walls 8, 8 and the partitions 9, the one side wall 8 being seen in side view, have a triangular shape, with their upper ends adjoining the undersurface 7 of the main body 2 of the fuselage. Both of the side-wall 8, 8 and partitions 9 are formed with increasing plate thickness towards the aft end. The front portion 4a of the air intake section 4 constitutes a stage S1 region, to be described (for simplicity of the drawing, only the central passage is indicated).

At the aft portion 4b of the air intake section 4, the space between the two side walls 8, 8 is partitioned in the width direction by a plurality of struts 12. Those are respectively integral with the partitions 9 and whose surfaces are smoothly connected, and is covered by a bottom wall 11 up to the point where these are joined with the engine air/fuel mixing and combustion body section 5. The spacing w between the side wall 8 and the adjacent strut 12 is set to ½ of the spacing W between adjacent two struts 12, 12, in order to ensure uniform action of the rocket jet with respect to the incoming airflow, as will be described. The passages that are defined by the struts 12 respectively constitute air introduction channels 10 whereby air from outside the fuselage is introduced into the combined engine 3. In this example, the front section 13 of each of the struts 12 constitutes an extension of the partition 9 that increases in thickness with the same rate of increase of thickness as the partition 9. Whereas the main section 14, aft from the middle thereof, is of constant thickness, but there is no restriction to this and the struts could be of a constant thickness over their entire length. Of the aft portions 4b, the portion of the air introduction channels 10 corresponding to the main section 14 is an air inlet of uniform cross section constituting the region of a stage S2, to be described (for simplicity of the drawing, indicated only in the central passage).

The rocket engine 15 is assembled with the struts 12 in an embedded condition with its axis in the longitudinal direction directed parallel with the direction of flow of the airflow 16 within the air introduction channels 10. The rocket engine 15 is preferably of a two-dimensional shape. But, since the height of the struts 12 is considerably higher than their width, it would also be possible to arrange cylindrical rockets of ordinary shape in a plurality of stages superimposed in the height direction in each strut 12. The aperture end face of the nozzle 17 of the rocket engine 15 is arranged at the aft end face of the struts 12. The jet 18 of the rocket engine 15 (hereafter referred to as the "rocket jet") that is ejected from the rocket nozzle 17 is directly injected into the combustion chamber 20. When the single-stage spacecraft 1 is at supersonic flight speed where the Mach number is larger than 1, but comparatively small, a perpendicular shock wave (Mach disk) 19 perpendicular to the jet direction is produced (see FIG. 3), but, in ultra-supersonic flight, a perpendicular shock wave 19 is not produced. Since the rocket jet 18 is normally injected spreading further in the lateral direction than the rocket engine 15, it provides means for restricting the airflow path area of the airflow 16 flowing in through the air introduction channels 10, i. e. supersonic diffuser.

In the engine air/fuel mixing and combustion body section 5 aft of the struts 12, a combustion chamber 20 is defined to be surrounded by the undersurface 7, side walls 8, 8 and bottom wall 11. This is a single chamber common to all of the airflow 16 and rocket jets 18 with no partitions therein. In the combustion chamber 20, on the upstream side, a jet and airflow coexisting section 21 is formed in which the airflow 16 and rocket jets 18 are present in zoned fashion. Where as yet without mixing; due to the rocket jets 18 formed in this jet and airflow coexisting section 21, the flow path area of the airflow 16 that is introduced through the air introduction channels 10 is changed in accordance with the shape of these rocket jets 18. The interior of this jet/airflow channel formation section 21 is in a zoned condition prior to mixing of the rocket jets 18 formed therein and the inflow of the airflow 16. The inflow area of the airflow 16 changes depending on the degree of spreading of the rocket jets 18 and so the airflow rate can also be changed. A mixing section 22 (stage S4) where the airflow 16 and the rocket jets 18 are mixed is formed at the downstream of the jet and airflow flowing, respectively, at the coexisting section 21. At the further downstream of this, there is formed a combustion section 23 (stage S5) where the mixed gases generated by mixing in the mixing section 22 are burnt. The combustion in the combustion section 23 is referred to as secondary combustion in contrast to the primary combustion in the rocket engine 15. An exhaust nozzle section 6 is formed downstream of the combustion section 23. The combustion gas generated by combustion in the combustion section 23 forms an exhaust gas flow 24 which undergoes semi-free expansion in the half nozzle section 6 (stage S6), thereby accelerating the exhaust speed. The air intake section 4 and the engine main body section 5 have a simple construction in which essentially no portions of variable shape are present.

Figure 3:
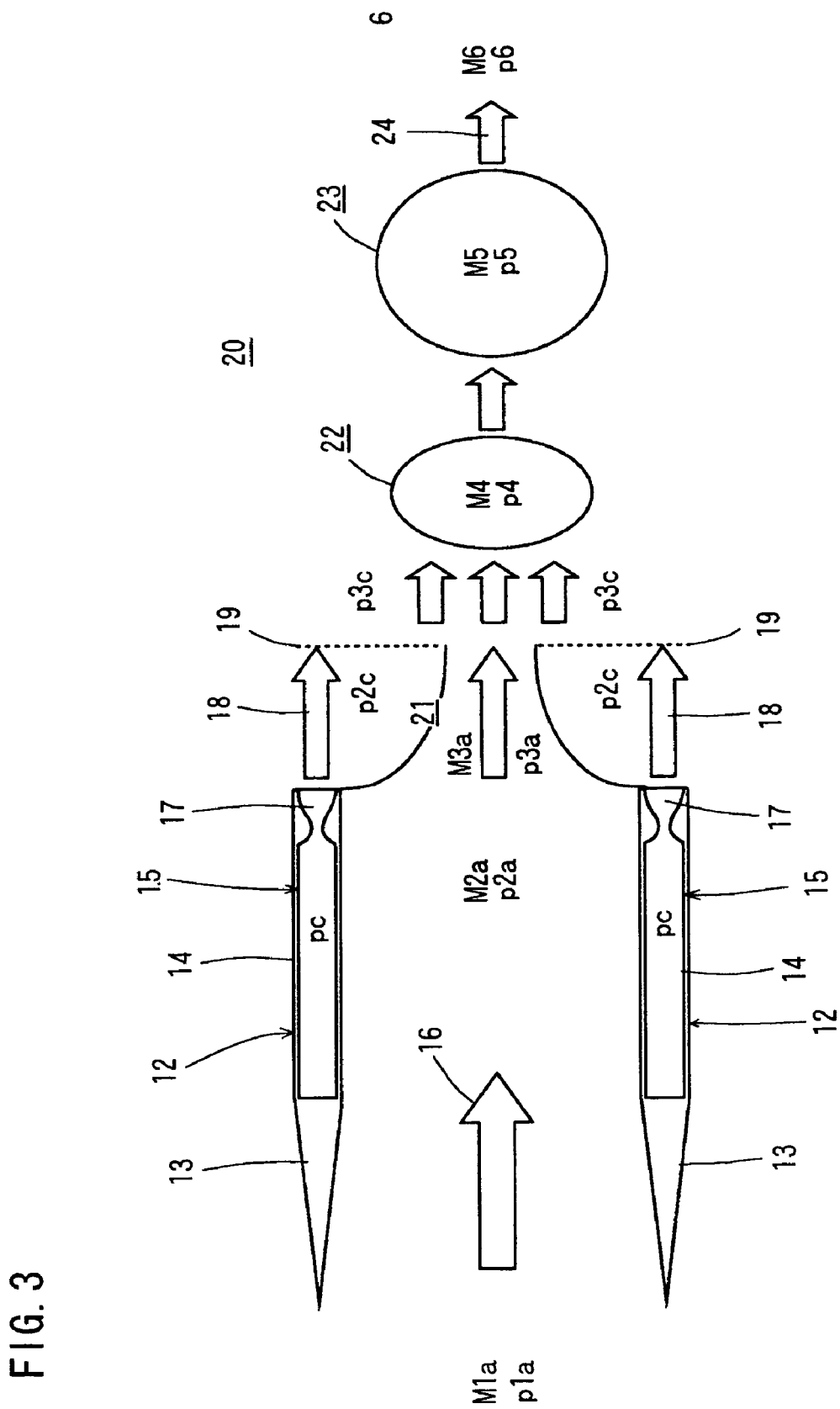
FIG. 3 is a combustion diagram for a combined engine for a single-stage spacecraft as shown in FIG. 2 and is a diagram showing the internal flow of the engine in the subsonic flight Mach number region (subsonic, $M\infty<1.0$)

FIG. 3 is a diagram showing the internal flow of the engine. M1$a$ and p1$a$ denote the inflow air Mach number and static pressure of the ramp section. M2$a$ and p2$a$ denote the Mach number and static pressure of the airflow 16 between the struts 12. M3$a$ and p3$a$ denote the airflow 16 prior to mixing. The combustion chamber pressure of the rocket engine 15 is denoted by pc. The upstream static pressure of the Mach disk of the rocket jets 18 is denoted by p2$c$. The downstream static pressure of the Mach disk of the rocket jets 18 is denoted by p3$c$. The Mach number of the flow after mixing, mixed in the mixing section 22 is denoted by M4 and its static pressure by p4. M5 and p5 denote the Mach number of the flow after combustion that has taken place in the combustion section 23 and its static pressure. M6 and p6 denote the Mach number of the exhaust flow 24 expanding into the atmosphere through the half nozzle 6 and its static pressure.

FIG. 3 shows the internal flow in the subsonic flight Mach number region (M$\infty$<1.0); the respective Mach numbers are: M$\infty$<1.0, M1$a$<1.0, M2$a$<1.0, M3$a$<1.0, M4<1.0, M5<1.0. The upstream static pressure p2$c$ of the Mach disk 19 of the rocket jets 18 plays the role of an ejector that sucks in the air. The downstream static pressure p3$c$ of the Mach disk 19 of the rocket jets 18 plays the role of a jet engine compressor typified by a Brayton cycle. The condition shown in FIG. 3 may be said to be similar to the operating condition in a front-fan turbojet engine. However, under a specific operating condition if the matching between the rocket engine combustion chamber pressure pc and the incoming airflow 16 is well designed, a condition is produced in which, even though M$\infty$<1.0, M3$a$>1.0. This is the so-called "choked airflow intake", which phenomenon might occur during transonic flights (corresponds to a variable transonic intake of turbojet engine), and improves engine performance. Furthermore, the perpendicular shock wave (Mach disk) 19, which is generated by the rocket jets 18, raises the combustion chamber pressure by raising the downstream static pressure p3$c$ higher than the upstream static pressure p2$c$. The Mach disk 19 also has the effect of preventing reverse propagation of static pressure disturbances which would be generated in the mixing and combustion stages (stages S4 and S5) into the upstream side of M2$a$, p2$a$, M1$a$ and p1$a$. That is actually thereby playing a role of compressor for a stabilized Brayton cycle of the turbojet in respect of the airflow 16. Also, by making the ratio of the rocket O/F (oxidizer flow rate/fuel flow rate) during low-speed flight below the equivalent ratio (i.e. excess fuel), the rocket jets 18 perform the role of fuel injection by providing excess fuel. The rocket jets 18 also play simultaneously the role of igniters in the combustion section 23 and flame holders. That is, the rocket engine combustion chamber pressure pc plays various roles, such as not only controlling the rocket jet flow rate, the incoming airflow rate by determining the air channel area immediately prior to mixing, static pressure in the mixing section, air/fuel ratio in the combustion section and combustion static pressure, but also injecting and igniting fuel.

Figure 4:
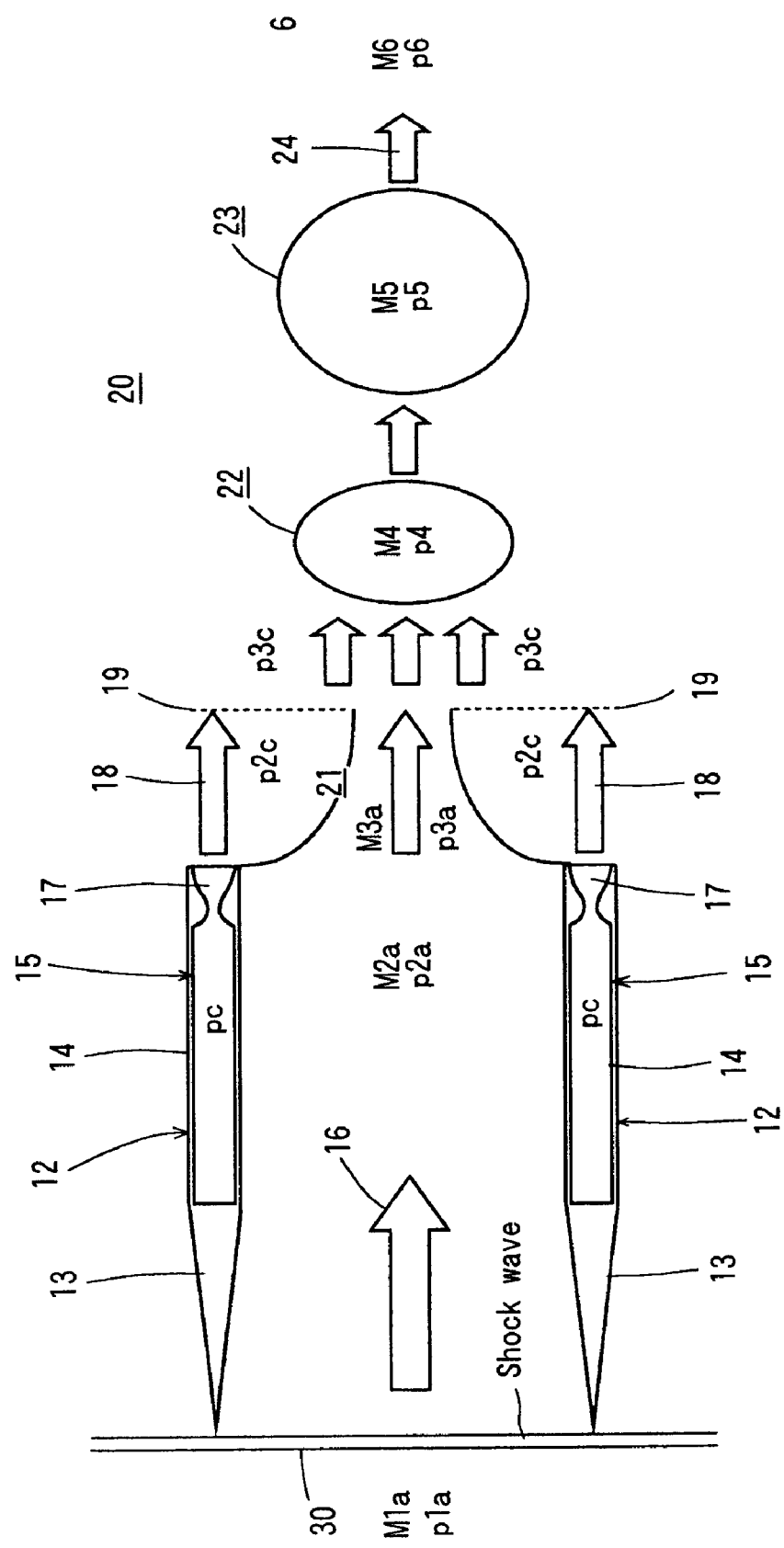
FIG. 4 is a diagram showing the internal flow of the engine in a combined engine for a single-stage spacecraft according to the present invention, in the low flight Mach number region (transonic to low supersonic, $1.0<M\infty<2$ to 3)

FIG. 4 is a diagram showing the engine interior flow in the low flight Mach number region (1.0<M$\infty$<2 to 3). The respective Mach numbers are in the condition: M$\infty$>1.0, M1$a$>1.0, M2$a$<1.0, M3$a$<1.0, M4<1.0, M5<1.0. A perpendicular shock wave 30 is generated upstream of the struts 12 in the incoming airflow 16. In addition to the description during subsonic flight given above, the rocket jets 18 perform the role of variable intake to choke the upstream perpendicular shock wave 30. This operating condition of the combined engine 3 may be described as similar to the operating condition of a turbofan engine fitted with an after burner.

Figure 5:
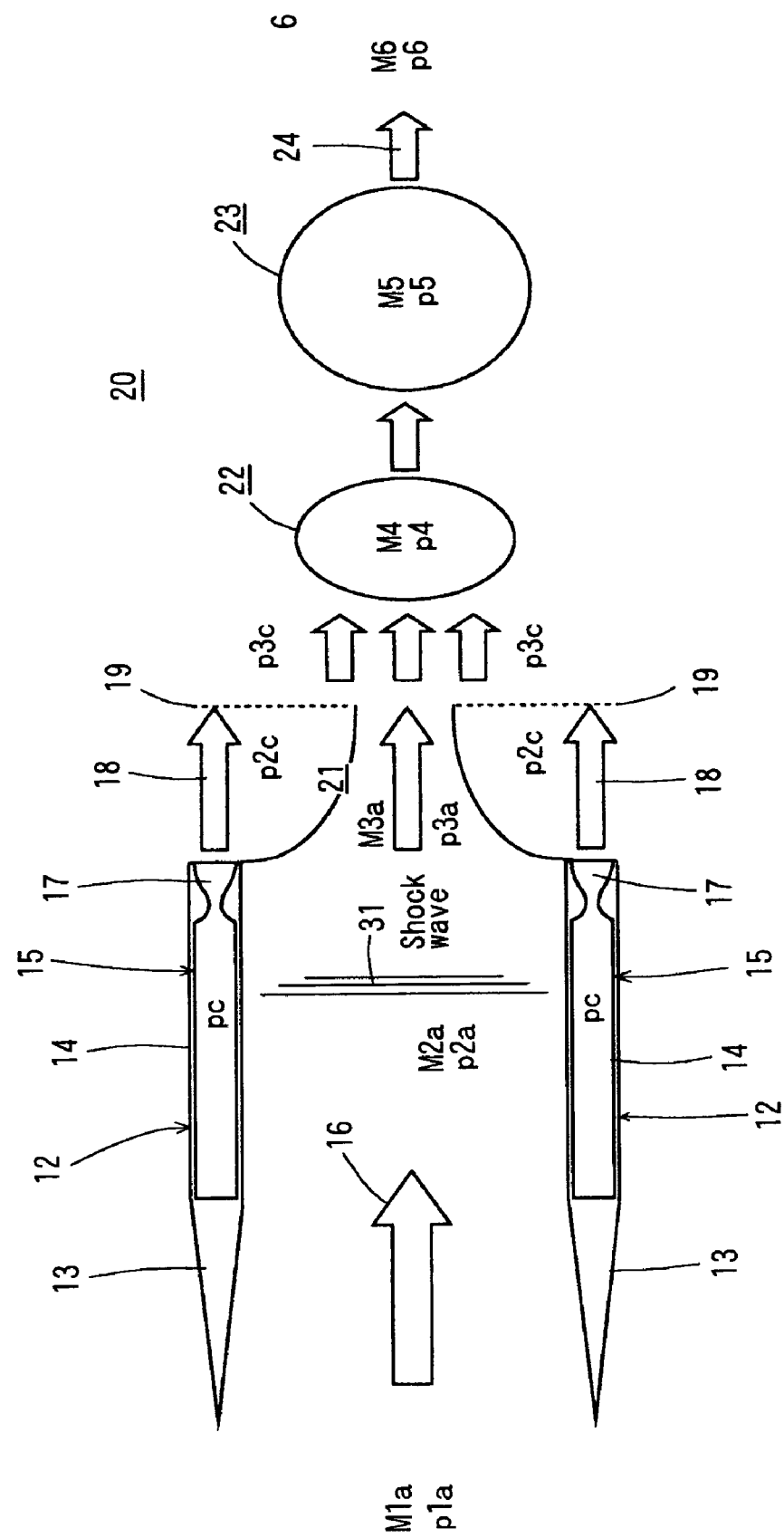
FIG. 5 is a diagram showing the internal flow of the engine in a combined engine for a single-stage spacecraft according to the present invention, in the flight Mach number region (supersonic, 2 to $3<M\infty<3$ to 4)

FIG. 5 is a diagram of the engine internal flow in the flight Mach number region (2 to 3<M$\infty$<3 to 4). The respective Mach numbers are in the condition: M$\infty$>1.0, M1$a$>1.0, M2$a$>1.0, M3$a$<1.0, M4<1.0, M5<1.0. A perpendicular shock wave 31 is generated between the struts 12 in the airflow 16, that is incoming through the air introduction channels 10. The role of the rocket jets 18 is the same as in the description in the case shown in FIG. 4. This operating condition of the combined engine 3 may be described as similar to the operating condition of a ram jet engine.

Figure 6:
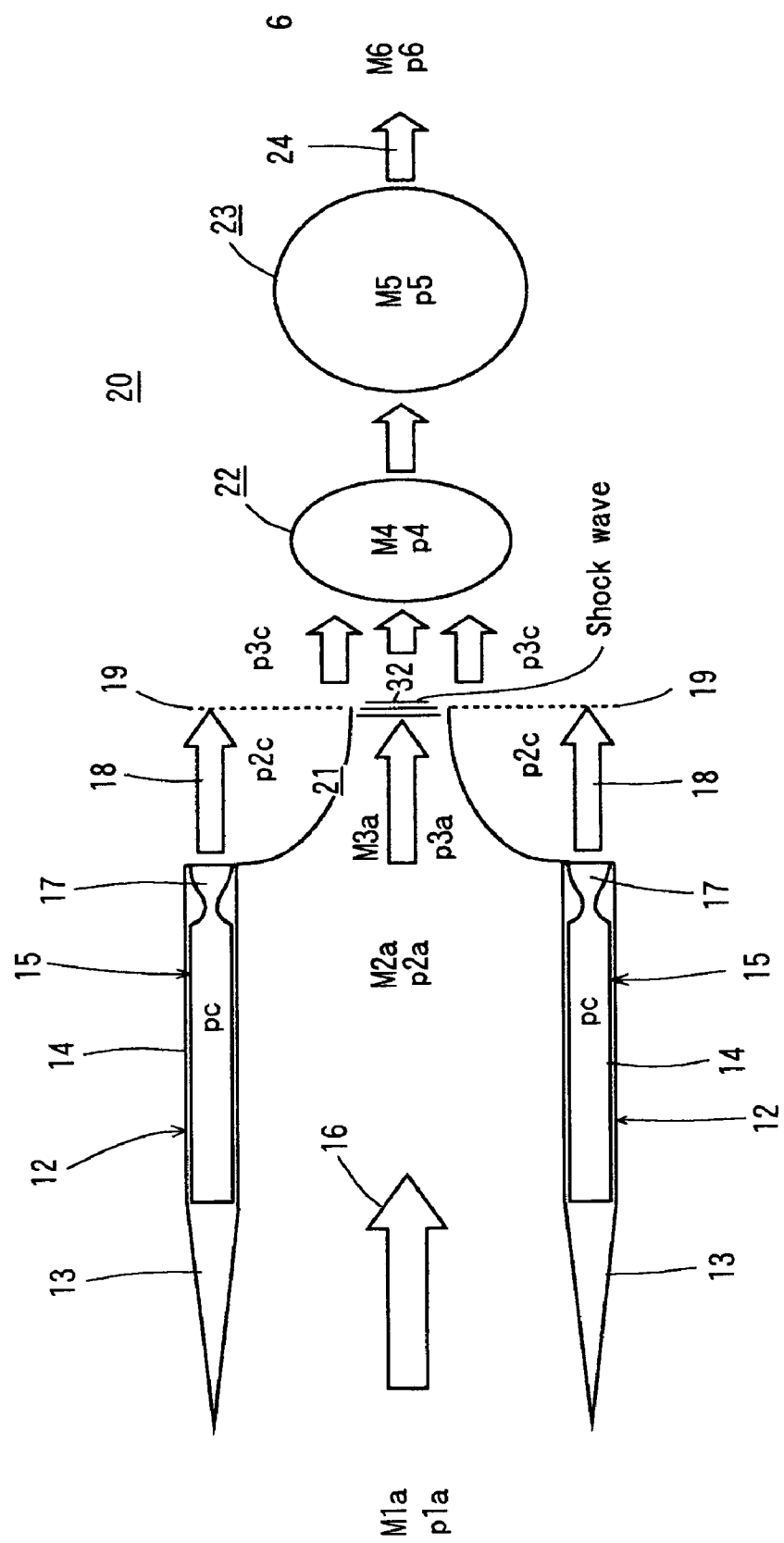
FIG. 6 is a diagram showing the internal flow of the engine in a combined engine for a single-stage spacecraft according to the present invention, in the flight Mach number region (high supersonic, 3 to $4<M\infty<5$ to 6)

FIG. 6 is a diagram of the engine internal flow in the flight Mach number region (3 to 4<M$\infty$<5 to 6). The respective Mach numbers are in the condition: M$\infty$>1.0, M1$a$>1.0, M2$a$>1.0, M3$a$>1.0, M4<1.0, M5<1.0. A perpendicular shock wave 32 is generated at a position at the same distance as the Mach disk 19 of the rocket jets 18, in the airflow 16 that is incoming through the air introduction channels 10. The role of the rocket jets 18 is the same as in the description in the case shown in FIG. 5. This operating condition of the combined engine 3 is similar to the operating condition of a ram jet engine, just as in the case of FIG. 5, but may be described as an operating condition in which the shape of the inlet and the diffuser are more throttled.

Figure 7:
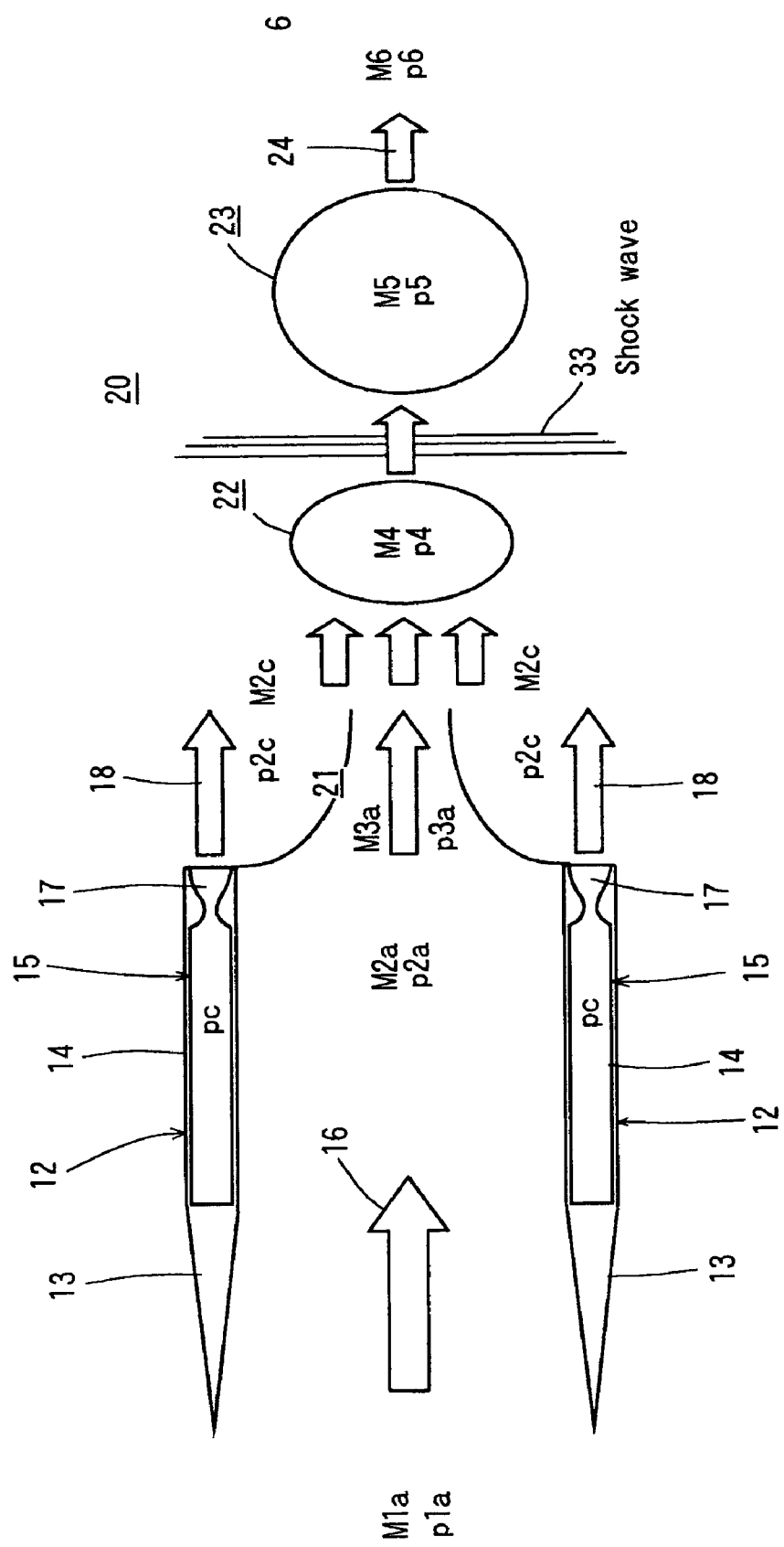
FIG. 7 is a diagram showing the internal flow of the engine in a combined engine for a single-stage spacecraft according to the present invention, in the flight Mach number region (high supersonic to ultra-supersonic, 5 to 7<M∞<7 to 8)

FIG. 7 is a diagram of the engine internal flow in the flight Mach number region (5 to 7<M$\infty$<7 to 8). The respective Mach numbers are in the condition: M$\infty$>1.0, M1$a$>1.0, M2$a$>1.0, M3$a$>1.0, M4>1.0, M5<1.0. A perpendicular shock wave 33 is generated in the mixing section 22 of the incoming airflow 16 and the rocket jets 18. Pressure fluctuations of the mixing section 22 and combustion section 23 are absorbed solely by movement of the perpendicular shock wave 33 and do not affect the front section of the incoming airflow 16 (stages 2 and 1). In addition to the role in the case shown in FIG. 5, the role performed by the rocket jets 18 is the role of an automatically adaptive supersonic diffuser (lowering the Mach number of the airflow and raising the static pressure). This operating condition of the combined engine 3 may be said to be similar to the operating condition of a scramjet engine.

Figure 8:
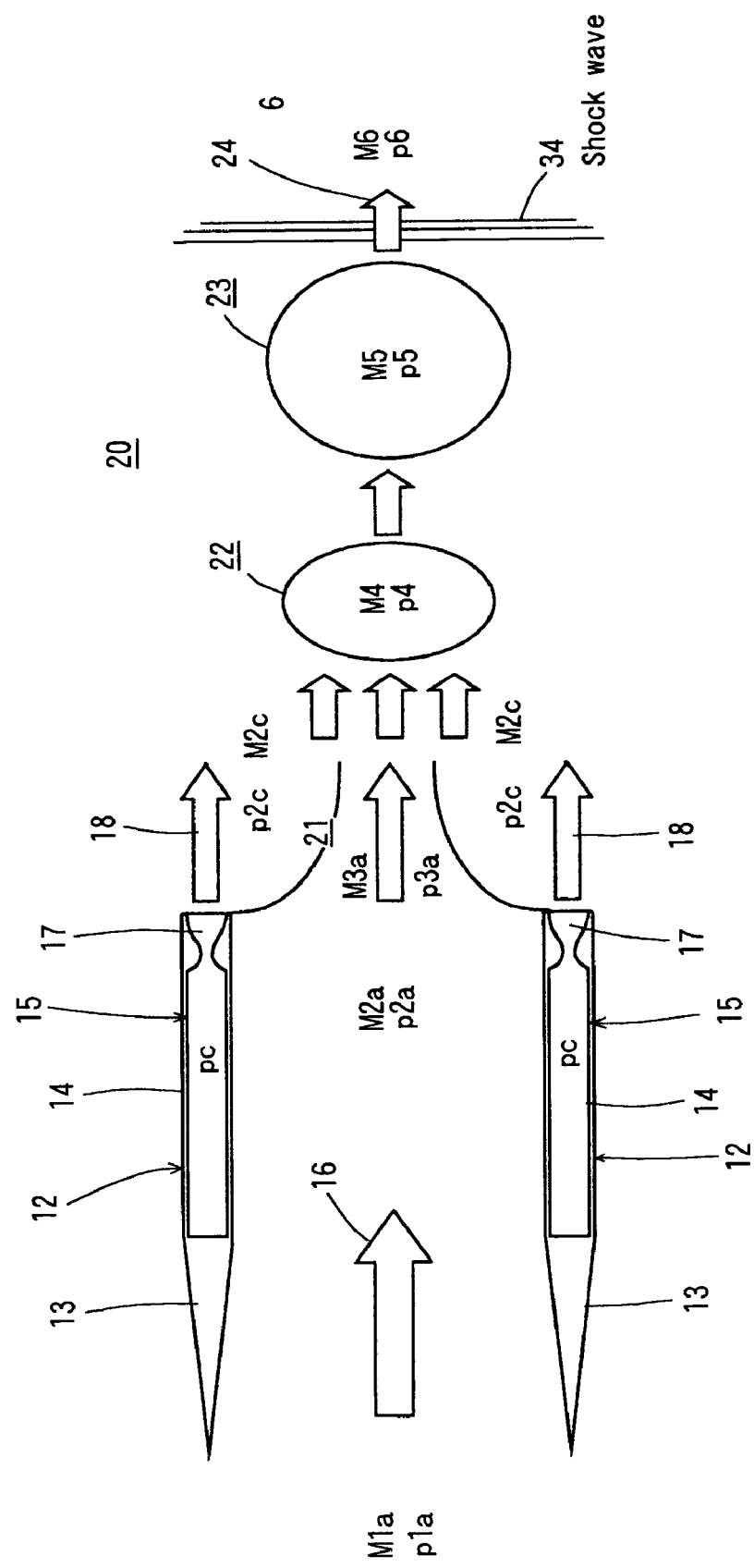
FIG. 8 is a diagram showing the internal flow of the engine in a combined engine for a single-stage spacecraft according to the present invention, in the flight Mach number region (ultra-supersonic, 7 to 8<M∞<9 to 11)

FIG. 8 is a diagram of the engine internal flow in the flight Mach number region (7 to 8<M$\infty$<9 to 11). The respective Mach numbers are in the condition: M$\infty$>1.0, M1$a$>1.0, M2$a$>1.0, M3$a$>1.0, M4>1.0, M5>1.0. The supersonic airflow 16 is mixed with the rocket jets 18 at supersonic speed (M3$a$>1.0), but, regarding the mixing conditions, the mixing pressure is such that the static pressures of the two flows are identical, so the Mach disk 19 naturally disappears. A perpendicular shock wave 34 is generated in the combustion section 23 of the air and the fuel, however pressure fluctuations in the combustion section 23 are also absorbed by the supersonic mixing and so have no effect on the upstream section. This operating condition of the combined engine 3 and the role of the rocket jets 18 are the same as in the case shown in FIG. 7.

Figure 9:
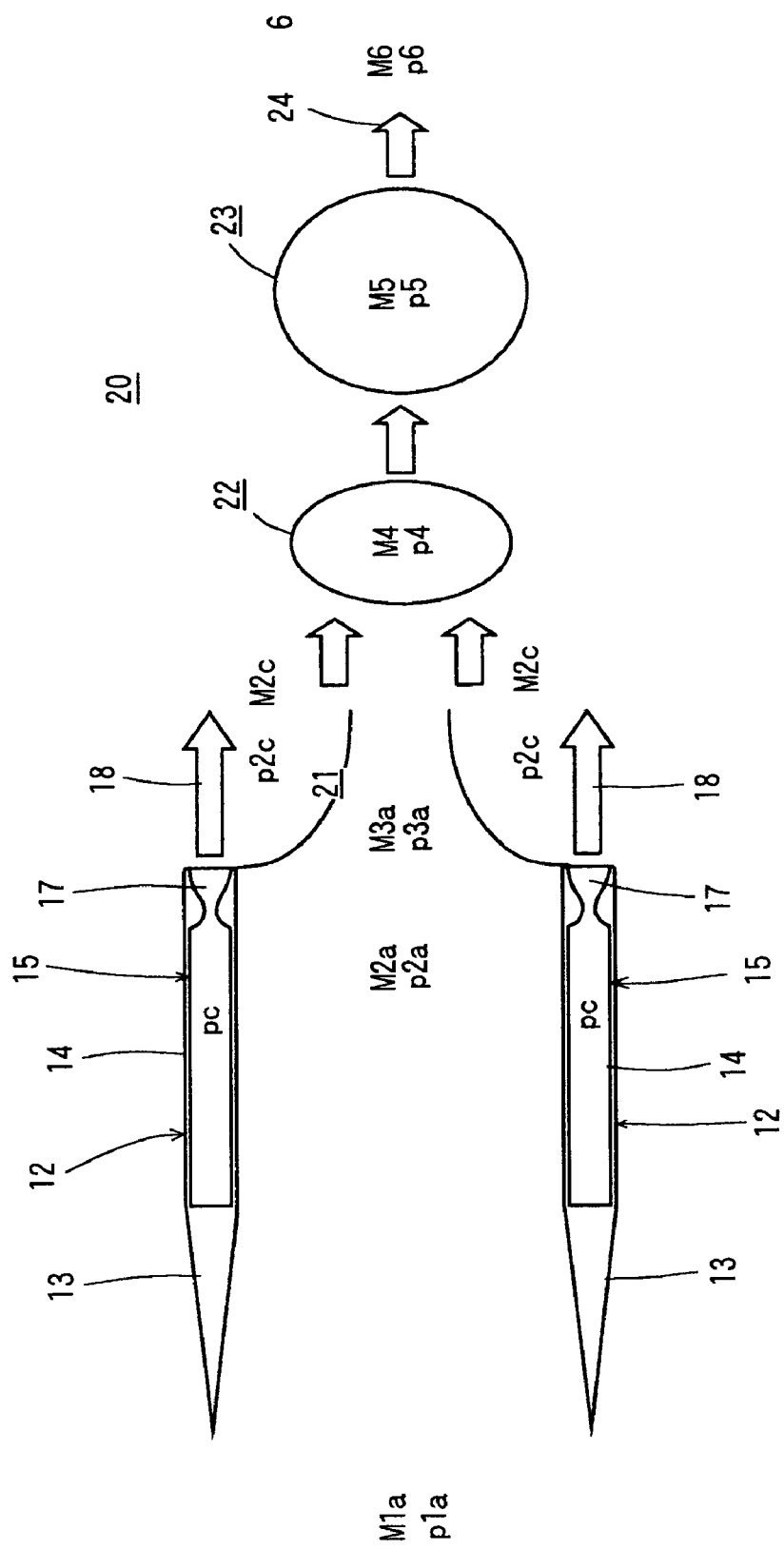
FIG. 9 is a diagram showing the internal flow of the engine in a combined engine for a single-stage spacecraft according to the present invention, in the flight Mach number region (ultra-supersonic, 9 to 11<M∞<20 to 22)

FIG. 9 is a diagram of the engine internal flow in the flight Mach number region (9 to 11<M∞<19 to 20) in the combined engine 3. The respective Mach numbers are in the condition: M∞>1.0, M1a>1.0, M2a>1.0, M3a>1.0, M4>1.0, M5>1.0. FIG. 9 shows the same combustion as in the case of a Brayton scramjet but the role of the supersonic diffuser in order to ensure the necessary static pressure in the combustion section is chiefly adaptively performed by the rocket jets 18. Pressure fluctuations in the combustion section 23 have no upstream effect on stage S2 and S1 and beyond. The role of the rocket jets 18 is chiefly to secure the necessary static pressure in the combustion section 23 by an supersonic diffuser effect that is automatically adaptive with mixing.

Figure 10:
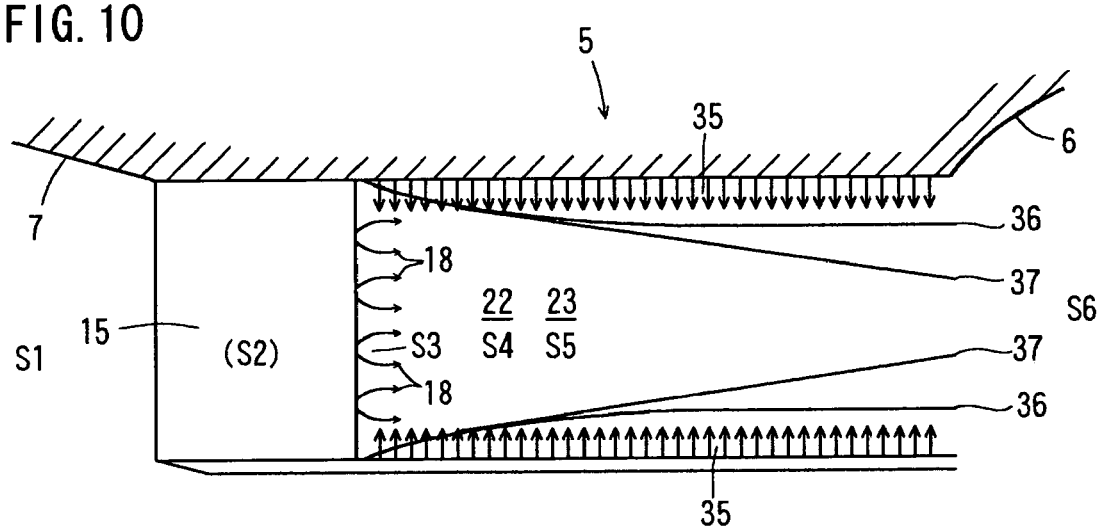
FIG. 10 is a diagram showing the development of a boundary layer by perspiration cooling in a mixing section and combustion section in a combined engine for a single-stage spacecraft according to the present invention and the generation of oblique shock waves thereby.

FIG. 10 is a diagram showing the development of a boundary layer produced by perspiration cooling in the mixing section 22 (stage S4) and the combustion section 23 (stage S5) in a combined engine 3 and the generation of oblique shock waves produced thereby. The internal flow in the flight Mach number region (M∞>19 to 20) is the same as in the case shown in FIG. 9; the respective Mach numbers are in the condition: M∞>1.0, M1a>1.0, M2a>1.0, M3a>1.0, M4>1.0, M5>1.0. The role of the supersonic diffuser, in such an ultra-supersonic flight region, is chiefly, to acquire the necessary combustion pressure in use of low rocket engine combustion chamber pressure pc. In such an ultra-supersonic flight speeds, the lower thrust is required for the vehicle under the acceleration limit, because the vehicle mass is reduced due to propellants consumption for obtaining such a high vehicle speed. The combustion pressure pc of the rocket engine must be low to implement low thrust flight. In order to acquire the reasonable air/fuel combustion chamber pressure, it becomes important to generate the oblique shock waves 37 by control of the development of the boundary layers 36. According to the perspiration cooling 35 by means of the fuel, the development of boundary layers is controlled for generation of oblique shock waves 37 so that pressure fluctuations in the combustion section 23 may have no effect upstream on the stages S2 and S1 and beyond. The role of the rocket jets 18 is to utilize the necessary static pressure in the combustion section 23 as assistance for rise of the static pressure due to the oblique shock wave 37 by development of a boundary layer 36 rather than pressure mixing. Thus, in a flight region in which the limit of the variable shape supersonic diffuser is exceeded, a supersonic diffuser is implemented as the type of controlling the development of the boundary layer rather than adopting mixing with the rocket combustion pressure.

The number of struts 12 to be provided may be adapted to the fuselage, in accordance with the mission of the single-stage spacecraft 1.

According to the present invention, because of the adoption of the above construction, a combined engine for a novel single-stage spacecraft can be provided. That is combining an air-breathing engine utilizing as oxidizer the oxygen present in the atmosphere and a rocket engine whereby thrust is obtained outside the atmosphere and which does not require any variable shape portion for changing over the engine shape in accordance with the flight speed. Specifically, a combined engine is obtained wherein, due to the reduction in engine weight, acceleration can be achieved with a single engine from the take-off speed up to Earth orbit. Consequently, the propulsion device can be reduced in weight by using the atmosphere as oxidizer whilst within the atmosphere.

What is claimed is:

1. A combined engine for a single-stage spacecraft, comprising an air intake section, an engine main body section including a combustion chamber, and an exhaust nozzle section, in this order, and comprising rocket engines that inject the engine exhaust flows as rocket jets into said combustion chamber are arranged on struts that partition said air intake section into a plurality of air introduction channels, wherein controlling the chamber pressure in said rocket engines allows the shapes of said rocket jets injected from said rocket engines to be varied controlling the states of the airflow introduced into said combustion chamber, the combustion pressure in said combustion chamber and the state of the gas-flow exhausted from said combustion chamber without any mechanical variable structures to be able to stably produce thrusts at the wide ranges of flight speeds from take-off to orbiting earth with a single engine.

2. The combined engine for a single-stage spacecraft according to claim 1, wherein said combustion chamber comprises a jet and airflow coexisting section in which both said rocket jets and airflows introduced through said air introduction channels are present, a mixing section in which said rocket jets and said airflows are mixed to form mixed gas, and a combustion section in which said mixed gas is burnt.

3. The combined engine for a single-stage spacecraft according to claim 2, wherein each flow rate of said airflows is controlled by varying the air channel area of said airflow immediately upstream of said mixing section by varying the shape of said rocket jets.

4. The combined engine for a single-stage spacecraft according to claim 2, wherein said air intake section comprises an equivalent function to a variable shape air intake section required for a Brayton cycle engine in supersonic or ultra-supersonic flight by varying the shape of said rocket jets.

5. The combined engine for a single-stage spacecraft according to claim 2, wherein said mixing section and said combustion section have an equivalent function to a variable shape diffuser required for a Brayton cycle engine in supersonic or ultra-supersonic flight by varying the shape of said rocket jets.

6. The combined engine for a single-stage spacecraft according to claim 5, wherein, the necessary combustion pressure is secured by controlling generation of oblique shock waves caused by development of boundary layers accompanying perspiration cooling in said mixing section and said combustion section.

7. The combined engine for a single-stage spacecraft according to claim 2, wherein changing the combustion chamber pressure of said rocket engines changes the shape of said rocket jets.

8. The combined engine for a single-stage spacecraft according to claim 2, wherein the air/fuel flow rate ratio in said mixing section is controlled by altering the equivalent ratio of oxidizer and fuel in the combustion chamber of said rocket engines.

9. The combined engine for a single-stage spacecraft according to claim 2, wherein the exhaust gas of said rocket engines works as a huge flame holder simultaneously as a huge igniter for said air/fuel combustion chamber.

10. The combined engine for a single-stage spacecraft according to claim 2, wherein said rocket jets generate Mach disks upstream of said mixing section in a subsonic or supersonic flight speed region.

11. The combined engine for a single-stage spacecraft according to claim 1, wherein the engine performance required by the given fuselage design is secured by providing a number of said rocket engines that satisfies the thrust requirements from take-off from the runway up to Earth orbit.

* * * * *